United States Patent [19]

Das et al.

[11] Patent Number: 4,639,394

[45] Date of Patent: Jan. 27, 1987

[54] NON-AQUEOUS DISPERSIONS PREPARED WITH STYRENE POLYMER DISPERSION STABILIZERS

[75] Inventors: Suryya K. Das, Pittsburgh; Rostyslaw Dowbenko, Gibsonia, both of Pa.

[73] Assignee: PPG Industries, Inc., Pittsburgh, Pa.

[21] Appl. No.: 718,756

[22] Filed: Apr. 1, 1985

[51] Int. Cl.$^4$ .................. C08K 5/01; C08L 53/00; B22B 5/16; B22B 27/06

[52] U.S. Cl. .................. 428/327; 428/323; 524/504; 524/505; 524/560; 524/562; 524/923; 525/88; 525/93; 525/94; 525/242; 525/296; 525/301; 525/302

[58] Field of Search .................. 428/327, 323; 524/504, 524/923, 560, 562, 505; 525/296, 301, 242, 88, 93, 94

[56] References Cited

U.S. PATENT DOCUMENTS

| | | | |
|---|---|---|---|
| 3,514,500 | 5/1970 | Osmond et al. | 260/874 |
| 3,607,821 | 9/1971 | Clarke et al. | 260/34.2 |
| 3,786,116 | 1/1974 | Milkovich et al. | 260/885 |
| 4,147,688 | 4/1979 | Makhlouf et al. | 260/33.6 EP |
| 4,427,820 | 1/1984 | Backhouse et al. | 524/923 |
| 4,493,914 | 1/1985 | Chattha | 524/923 |
| 4,530,957 | 7/1985 | Theodore et al. | 524/923 |

FOREIGN PATENT DOCUMENTS

967051 8/1964 United Kingdom.

OTHER PUBLICATIONS

Napper, "Polymeric Stabilization of Colloidal Dispersions", Academic Press, London, pp. 115,117,149,318, 1983.

Dispersion Polymerization in Organic Media, Barrett, John Wiley & Sons, 1975, pp. 104–106 and 217–218.

*Primary Examiner*—Allan M. Lieberman
*Attorney, Agent, or Firm*—William J. Uhl

[57] ABSTRACT

Non-aqueous dispersions of polymeric microparticles are disclosed. The dispersions are prepared by free radical initiated addition polymerization of a polymerizable monomer in the presence of a dispersion stabilizer in an organic liquid. The dispersion stabilizer is a styrene polymer terminated with an alpha, beta-ethylenically unsaturated group. The polymeric microparticles are useful as rheology modifiers in coating compositions.

37 Claims, No Drawings

NON-AQUEOUS DISPERSIONS PREPARED WITH STYRENE POLYMER DISPERSION STABILIZERS

BACKGROUND OF THE INVENTION

1. Field of the Invention: The present invention relates to non-aqueous dispersions of polymeric microparticles, and to the microparticles themselves. The invention also relates to coating compositions containing the microparticles and to coated articles derived therefrom.

2. Brief Description of the Prior Art: Non-aqueous dispersions of polymeric microparticles which are prepared by free radical addition polymerization of ethylenically unsaturated monomers in a diluent or in an organic liquid are known in the art. Polymerization is usually conducted in the presence of a dispersion stabilizer, one portion of which is solvated by the organic liquid and one portion of which is compatible with the polymeric microparticles. U.S. Pat. No. 3,514,500 describes such dispersions. The bond between the stabilizer and the polymeric microparticle may be simply an attraction due to similar polarity between the two.

U.S. Pat. No. 3,607,821 also describes non-aqueous dispersions of polymeric microparticles prepared in a manner similar to that of U.S. Pat. No. 3,514,500 but in which the dispersion stabilizer contains ethylenically unsaturated double bonds which react with the polymerizing ethylenically unsaturated double bonds in the monomer to form a more stable dispersion.

The above-described techniques for preparing non-aqueous dispersions of polymeric microparticles can be used to prepare dispersions of crosslinked polymeric microparticles. For example, as disclosed in U.S. Pat. No. 4,147,688, an ethylenically unsaturated monomer mixture containing at least two monomers which are difunctional with regard to one another such as glycidyl methacrylate and methacrylic acid can be copolymerized in an organic diluent such as pentane in the presence of one of the dispersion stabilizers mentioned above to produce crosslinked polymeric microparticles. The microparticles have been found to be useful as flow control agents in coating compositions. One disadvantage of these crosslinked polymeric microparticles is that they can cause a yellowing of clear coats, particularly clear coats which are applied over pigmented base coats in automotive top coat applications.

SUMMARY OF THE INVENTION

The present invention relates to non-aqueous dispersions of polymeric microparticles, to the polymeric microparticles themselves, to coating compositions employing the microparticles and to coated articles derived from the coating compositions. The dispersions are prepared by a free radical initiated addition polymerization of a polymerizable ethylenically unsaturated monomer component in the presence of a dispersion stabilizer and in an organic liquid. The dispersion stabilizer is a styrene polymer containing ethylenic unsaturation in only the terminal position. Surprisingly, the polymeric microparticles prepared with the styrene-containing polymer dispersants do not yellow clear coats.

ADDITIONAL PRIOR ART

Styrene polymers containing ethylenic unsaturation in the terminal position only are disclosed in U.S. Pat. No. 3,786,116. These polymers are further disclosed as being polymerizable with ethylenically unsaturated monomers via bulk, solution, aqueous suspension and aqueous emulsion polymerization techniques to form graft copolymers. However, there is no disclosure of using these polymers as dispersion stabilizers in non-aqueous dispersion polymerizations to form stable dispersions of polymeric microparticles.

The use of styrene polymers in non-aqueous dispersion polymerization is disclosed in DISPERSION POLYMERIZATION IN ORGANIC MEDIA by Barret, John Wiley and Sons, 1975, pages 104–106 and pages 217–218. Styrene polymers prepared with butyl lithium as an initiator have been employed as soluble components linked with styrene or methyl methacrylate as anchor groups to form AB block copolymers which can be used as a dispersant in both anionic and free radical dispersion polymerization techniques. However, there is no disclosure in this reference of using a styrene polymer containing terminal ethylenic unsaturation as a dispersion stabilizer for non-aqueous dispersion polymerization. Polymers prepared using this technique would not be blocked copolymers such as described in the reference but rather would be graft copolymers.

DETAILED DESCRIPTION

The dispersion stabilizers of the present invention are styrene polymers containing ethylenic unsaturation in only the terminal position. These stabilizers can be prepared by anionic polymerization techniques in which a so-called living polymer is first prepared and the living polymer is ultimately reacted with an alpha, beta-ethylenically unsaturated group-containing compound containing a group which is co-reactive with the living polymer.

The living polymers can be prepared by contacting a styrene monomer with an alkali metal hydrocarbon in the presence of an inert organic diluent which does not participate in or interfere with the polymerization reaction.

The styrene monomers which can be used in preparing the styrene polymer dispersion stabilizers are styrene itself, alkyl-substituted styrenes such as alpha-methylstyrene, t-butylstyrene, vinyl toluene and its isomers. Mixtures of various styrene monomers can be used in preparing the styrene polymer as can mixtures of styrene polymers and other monomers capable of anionic polymerization as long as the resultant copolymer is soluble in the organic liquid which is used in the non-aqueous dispersion polymerization which is described in detail below. Examples of other suitable copolymerizable monomers are ethylene, propylene, isoprene, butadiene, methylmethacrylate and butylmethacrylate.

The initiators for these anionic polymerizations can be alkali metal hydrocarbons, preferably those which produce a monofunctional living polymer, i.e., only one end of the polymer containing a reactive anion which results in a dispersion stabilizer containing one ethylenically unsaturated group. Those catalysts found suitable include the lithium, sodium or potassium hydrocarbons as represented by the formula RMe where Me is an alkali metal such as sodium, lithium or potassium and R represents a hydrocarbon radical, for example, an alkyl radical containing up to about 20 carbon atoms, and preferably up to about 8 carbon atoms, an aryl radical, an alkaryl radical or an aralkyl radical. Illustrative alkali metal hydrocarbons include ethyl sodium, n-butyl potassium, phenyl sodium, sec-butyl lithium and t-butyl lithium. Sec-butyl lithium is the preferred initiator because it has a fast initiation.

The alkali metal hydrocarbons are either available commercially or may be prepared by known methods, such as by the reaction of a halohydrocarbon, halobenzene and the appropriate alkali metal.

An inert solvent generally is used to facilitate heat transfer and adequate mixing of initiator and monomer. Hydrocarbons and ethers are the preferred solvents. Solvents useful in the anionic polymerization process include the aromatic hydrocarbons such as benzene, toluene, xylene, ethylbenzene, t-butylbenzene, etc. Also suitable are the saturated aliphatic and cycloaliphatic hydrocarbons such as n-hexane, n-heptane, n-octane, cyclohexane and the like. In addition, aliphatic and cyclic ether solvents can be used, for example, dimethyl ether, diethyl ether, dibutyl ether, tetrahydrofuran and dioxane.

The amount of initiator determines the molecular weight of the living polymer. If a small proportion of initiator is used, with respect to the amount of monomer, the molecular weight of the living polymer will be larger than if a large proportion of initiator is used. Generally, it is advisable to add initiator dropwise to the monomer until the persistence of the characteristic color of the organic anion, then add the calculated amount of initiator for the molecular weight desired.

The concentration of the monomer charged to the reaction vessel can vary widely and can be as high as 50 percent by weight or higher based on the weight of the reaction mixture. However, the monomer concentration is usually from about 5 percent to about 25 percent in order to achieve adequate mixing.

Generally, the initiator concentration can range from about 0.001 to about 0.1 mole of active alkali metal per mole of monomer, or higher. Preferably, the concentration of the initiator will be from about 0.01 to about 0.004 mole of active alkali metal per mole of monomer.

The temperature of the polymerization will depend on the monomer. Generally, the reaction can be carried out at temperatures ranging from about −100° C. up to about 100° C. When using aliphatic and hydrocarbon diluents, the preferred temperature range is from about −10° C. to about 100° C. With ethers as the solvent, the preferred temperature range is from about −100° C. to about 100° C.

The preparation of the living polymer can be carried out by adding a solution of the alkali metal hydrocarbon initiator in an inert organic solvent to a mixture of monomer and diluent at the desired polymerization temperature and allowing the mixture to stand with or without agitation until the polymerization is completed. An alternative procedure is to add monomer to a solution of the catalyst in the diluent at the desired polymerization temperature at the same rate that it is being polymerized. By either method the monomer is converted quantitatively to a living polymer as long as the system remains free of impurities which inactivate the anionic species. Preferably, all of the reactive ingredients are added together rapidly to insure the formation of a uniform molecular weight distribution of the polymer.

The anionic polymerization must be carried out under carefully controlled conditions, so as to exclude substances which destroy the catalytic effect of the catalyst or initiator. For example, such impurities as water, oxygen, carbon monoxide, carbon dioxide, and the like. Thus, the polymerizations are generally carried out in dry equipment, using anhydrous reactants, and under an inert gas atmosphere, such as nitrogen, helium, argon, methane, and the like.

The living polymers are terminated by reaction with a halogen-containing compound which also contains a polymerizable alpha, beta-ethylenically unsaturated moiety, preferably acrylate unsaturation, i.e.,

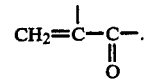

Suitable halogen-containing terminating agents include: the vinyl haloalkyl ethers wherein the alkyl groups contain six or fewer carbon atoms such as methyl, ethyl, propyl, butyl, amyl or hexyl; vinyl esters or haloalkanoic acids wherein the alkanoic acid contains six or fewer carbon atoms, such as acetic, propanoic, butyric, pentanoic, or hexanoic acid; olefinic halides having six or fewer carbon atoms such as vinyl halide, allyl halide, methallylhalide; halides of dienes such as 2-halomethyl-1,3-butadiene, epihalohydrins and acrylyl and methacrylyl halides which are preferred. The halo groups may be chloro, fluoro, bromo, or iodo; preferably, it is chloro.

Termination of the living polymer by any of the above types of terminating agents is accomplished simply by adding the terminating agent to the solution of living polymer at the temperature at which the living polymer is prepared. A slight molar excess of the terminating agent, with respect to the amount of catalyst, may be used.

The termination may be conducted in any suitable inert solvent. Generally, it is advisable to utilize the same solvent system employed in the preparation of the living polymer.

In some instances, because of the nature of the living polymer and the monomer from which it is prepared, or because of the nature of the terminating agent, certain deleterious side reactions occur which result in an impure product.

One means for overcoming side reactions is to "cap" the highly reactive living polymer with a less reactive reactant. Examples of some preferred "capping agents" include the lower alkylene oxides, i.e., one having eight or fewer carbon atoms such as ethylene and propylene oxide. The "capping" reaction yields a product which gives a purer product when subsequently reacted with a terminating agent containing a functional group or active hydrogen. The capping reaction is carried out quite simply, as in the case of the terminating reaction, by adding the capping reactant to the living polymer at polymerization temperatures. The reaction occurs immediately.

The above-described ethylene oxide "capped" polymer can be conveniently terminated with a compound containing a moiety reactive with the anion of the capped polymer and terminating agents such as those described above. Typical terminating agents include acrylyl chloride, methacrylyl chloride, vinyl-2-chloroethyl ether, vinyl chloroacetate, allyl and methallyl chloride.

The styrene polymer will usually have a number average molecular weight as determined by gel permeation chromatography using a polystyrene standard of at least 1000, preferably within the range of 5,000 to 50,000, more preferably 10,000 to 35,000, and most preferably 12,000 to 25,000.

The styrene polymer described above is used as a dispersion stabilizer for non-aqueous dispersion addition polymerization of a polymerizable ethylenically unsaturated monomer component. The polymerization is conducted in an organic liquid, usually one in which the monomer component is soluble but the resultant polymer is insoluble. The polymerization is initiated by free radicals.

The polymerizable ethylenically unsaturated monomer component can be a single monomer or as is more usual a mixture of monomers. Preferably, the monomer component contains polymerizable acrylate unsaturation, that is, one or more of the monomers containing acrylate unsaturation, i.e.,

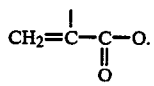

Examples of monomers containing acrylate unsaturation include alkyl esters of acrylic or methacrylic acid such as those having 1 to 4 carbon atoms in the alkyl group. Illustrative of such compounds are the alkyl acrylates such as methyl acrylate, ethyl acrylate, propyl acrylate and butyl acrylate, and the alkyl methacrylates such as methyl methacrylate, ethyl methacrylate, propyl methacrylate and butyl methacrylate.

Examples of other ethylenically unsaturated monomers which may advantageously be employed include, for example, the vinyl aromatic hydrocarbons such as styrene, alpha-methylstyrene, and vinyl toluene; unsaturated esters of organic and inorganic acids such as vinyl acetate, vinyl halides such as vinyl chloride, and the unsaturated nitriles such as acrylonitrile, methacrylonitrile, and ethacrylonitrile. The monomer charge will usually constitute about 60 to 99 percent by weight of the monoethylenically unsaturated monomers mentioned above based on total weight of monomer solids.

In addition to the monoethylenically unsaturated monomers mentioned above, functional group-containing polymerizable ethylenically unsaturated monomers, that is, those containing hydroxyl and/or carboxylic acid groups, can be used. Examples of such suitable functional group-containing polymers are hydroxypropyl acrylate, hydroxyethyl methacrylate, acrylic acid and methacrylic acid. Usually, these functional monomers will be present in amounts of about 0.5 to 40 percent by weight monomers based on total weight of the ethylenically unsaturated monomers.

The polymeric microparticles which are formed in the practice of the invention are preferably crosslinked. Crosslinking occurs by using as a portion of the polymerizable monomer component a first and second ethylenically unsaturated monomer each having functionalities capable of a crosslinking reaction with one another, i.e., polyfunctional monomers. Examples of suitable polyfunctional monomers are those which include multiple unsaturated groups such as polyol acrylates and methacrylates. Specific examples include ethylene glycol dimethacrylate, trimethylolpropane triacrylate, as well as divinyl compounds such as divinyl benzene.

The polyfunctional monomers can also be monoethylenically unsaturated monomers having additional functionalities which are co-reactive with one another. Examples of suitable co-reactive functionalities would be a first and second ethylenically unsaturated monomer which contain isocyanate and hydroxyl groups; acid and epoxide groups; epoxide and amine groups and acid, imine and alkoxysilane groups. Examples of suitable monomers include isocyanatoethyl methacrylate, hydroxyethyl methacrylate, methacrylic acid, glycidyl methacrylate, aminoethylmethacrylate, ethylene imine and gamma-methacryloxypropyltrimethoxysilane.

The proportion of such crosslinking monomers employed in the process of the invention usually ranges from about 0.5 to 15 percent by weight based on total weight of the monomers used in the polymerization process.

The ethylenically unsaturated monomers are polymerized in an organic dispersing liquid, usually one which solubilizes the monomers but in which the resulting polymer is essentially not soluble and forms a dispersed polymer particle. The dispersing liquid is preferably an aliphatic or cycloaliphatic hydrocarbon. A pure aliphatic or cycloaliphatic hydrocarbon or a mixture of two or more may be employed. Also, the mixture of aliphatic hydrocarbons and aromatic hydrocarbons may be used as long as the required solubility factors are met. Other organic solvents such as ketones, ethers and esters can be used in minor amounts provided they do not adversely affect the solubility requirements of the system.

Examples of suitable dispersing liquids are pentane, hexane, heptane, octane, toluene and naphthenic hydrocarbons and mixtures thereof such as mineral spirits and naphtha.

The amounts of polymerizable monomers, dispersing liquid and stabilizer should be from about 20 to 70 percent by weight of polymerizable monomers; 25 to 80 percent by weight of the dispersing liquid and 1 to 25 percent by weight of stabilizer, the percentage by weight being based on total weight of polymerizable monomers, dispersing liquid and stabilizer.

Examples of suitable free radical initiators are cumene hydroperoxide, benzoyl peroxide or a similar peroxy compound or azo compounds such as azobis-(isobutyronitrile).

Typically, the dispersing liquid, stabilizer, free radical initiator and a portion of the polymerizable monomers are heated in a suitable reaction vessel to reflux. The remaining portion of the monomers, with some additional free radical initiator and optionally a chain transfer agent such as an alkyl mercaptan are added slowly to the refluxing mixture. After addition is complete, the reaction mixture is maintained at elevated temperature to complete the polymerization.

The resultant non-aqueous dispersion consists essentially of insoluble particles dispersed throughout the dispersing liquid. These particles have average particle sizes ranging from about 0.1 to 10, more usually 0.2 to 0.5 microns as determined by a Scanning Electron Microscope. In determining the particle size, the non-aqueous dispersion is diluted in n-heptane to about 0.1 to 1.0 resin solids and spray applied to a glass viewing slide. A conductive coating of gold-platinum was applied to the particles before viewing, and different views were taken to view approximately 100 particles and an average particle size value reported. The Scanning Electron Microscope was an ISI Model DS 130. The concentration of the particles depends somewhat on the original concentration of monomer solids and is usually within the range of 20 to 60 percent by weight based on total weight of the dispersion. At the completion of the polymerization, the solids content may be increased somewhat by removal of the organic liquid without the loss of dispersion stability.

Depending on the selection of monomers used in preparing the non-aqueous dispersion, the microparticles may be crosslinked, or a portion may be crosslinked and a portion uncrosslinked. The degree of crosslinking of the microparticle dispersion can be determined by the solubility of the microparticles in a strong solvent such as acetone. The solubility in acetone can be determined by separating the microparticle from its dispersion, placing it in a Soxhlet extractor and extracting for 12 hours with boiling acetone. For crosslinked particles, at least 40, preferably at least 60, and more preferably at least 80 percent by weight of the polymer will not be extracted.

The non-aqueous dispersions are useful in the formulation of coating compositions. They can form the principal binder of the coating composition or they can be used as additives for coating compositions where they have been found to be effective as rheology modifiers and flow control agents. For this purpose, the crosslinked microparticles are preferred. When used in this manner, the microparticles are combined with film-forming polymers, usually organic solutions of film-forming polymers, with the microparticles being insoluble in the film-forming polymer solution and being dispersed therein. The polymeric microparticle dispersions can be incorporated into coating compositions by simply mixing the dispersion with a coating composition. Alternately, the microparticles can be separated from the dispersion by spray drying, filtering, coagulating and filtering, dried and mixed into the coating composition.

The film-forming polymer may be any of the polymers known to be useful in coating compositions. One suitable class of polymer consists of those which are derived from one or more ethylenically unsaturated monomers. Particularly useful monomers of this class are the acrylic addition polymers which are well known for the production of coatings in the automobile industry, that is to say, polymers or copolymers of one or more alkyl esters of acrylic acid or methacrylic acid optionally together with other ethylenically unsaturated monomers. These polymers may be either of the thermoplastic type or the thermosetting crosslinking type. Suitable acrylic esters for either type of polymer include methyl methacrylate, ethyl methacrylate, propyl methacrylate, butyl methacrylate, ethyl acrylate, butyl acrylate and 2-ethylhexyl acrylate. Suitable other copolymerizable monomers include vinyl acetate, vinyl propionate, acrylonitrile, styrene and vinyl toluene. Where the polymer is required to be of the crosslinking type, suitable functional monomers are to be used in addition to the latter and include acrylic acid, methacrylic acid, hydroxyethyl acrylate, hydroxyethyl methacrylate, 2-hydroxypropyl acrylate 2-hydroxypropyl methacrylate, N-(alkoxymethyl) acrylamides and N-(alkoxymethyl) methacrylamides where the alkoxy group may be, for example, a butoxy group.

The film-forming polymer may be prepared by solution polymerization of the monomer or monomers in the presence of a suitable catalyst or initiator such as organic peroxides or azo compounds, for example, benzoyl peroxide or azodiisobutyronitrile. Conveniently, the polymerization may be carried out in the same organic liquid that is to form the diluent constituent of the coating composition or in a liquid which is to form a part of that diluent.

Besides the acrylic addition polymer, examples of other film-forming polymers are polyester polyols and poly(ester-urethane) polyols.

Polyester polyols can be prepared by polyesterification of an organic polycarboxylic acid or anhydride thereof with organic polyols and/or an epoxide. Usually the polycarboxylic acids and polyols are aliphatic or aromatic dibasic acids and diols.

The diols which are usually employed in making the polyester include alkylene glycols such as ethylene glycol, neopentyl glycol and other glycols such as cyclohexanedimethanol and caprolactone diol, for example, the reaction product of epsilon-caprolactone and ethylene glycol. Polyols of higher functionality such as trimethylolpropane can also be used. Higher molecular weight polyols such as those produced by oxyalkylating lower molecular weight polyols can also be used.

The acid component of the polyester consists primarily of monomeric carboxylic acids or anhydrides having 2 to 18 carbon atoms per molecule. Among the acids which are useful are phthalic acid, tetrahydrophthalic acid, hexahydrophthalic acid, adipic acid, and azelaic acid. There may also be employed higher polycarboxylic acids such as trimellitic acid. Where acids are referred to above, it is understood that anhydrides of those acids which form anhydrides can be used in place of the acid. Also, lower alkyl esters of the acids such as dimethyl phthalate can be used.

Besides polyester polyols formed from polybasic acids and polyols, polylactone-type polyesters can also be employed. These products are formed from the reaction of a lactone such as epsilon-caprolactone and a polyol. Such products are described in U.S. Pat. No. 3,169,945 to Hostettler.

Besides the polyester polyols, polyurethane polyols can also be used. These polyols can be prepared by reacting the above-mentioned polyester polyols with a minor amount of isocyanate (OH/NCO equivalent ratio greater than 1:1) so that free hydroxyl groups are present in the product. In addition to the high molecular weight polyols mentioned above, mixtures of both high molecular weight and low molecular weight polyols may be used. Among the low molecular weight polyols are diols and triols such as aliphatic polyols including alkylene polyols containing from 2 to 18 carbon atoms. Examples include ethylene glycol, 1,4-butanediol, 1,6-hexanediol, and cyclohexanedimethanol. An example of a triol is trimethylolpropane.

The organic polyisocyanate which is used in preparing the polyurethane polyols can be an aliphatic or an aromatic isocyanate or a mixture of the two. Aliphatic isocyanates provide better color stability in the resultant coating. Diisocyanates are preferred although higher polyisocyanates can be used. Examples of suitable polyisocyanates are 4,4'-diphenylmethane diisocyanate, toluene diisocyanate, 1,6-hexamethylene diisocyanate, isophorone diisocyanate, and 4,4'-methylene-bis-(cyclohexylisocyanate). An example of a higher functionality polyisocyanate is polymethylene polyphenyl isocyanate.

To form a thermosetting composition, a curing agent or crosslinking agent is included in the composition, although the acrylic polymers containing N-alkoxymethyl groups and hydroxyl groups can be made self-curing. Typical curing or crosslinking agents are those which are capable of reacting with the active hydrogens in the film-forming polymer to give a thermoset composition upon curing. Examples of suitable crosslinking agents are aminoplasts and polyisocyanates including blocked polyisocyanates. Aminoplasts are obtained by a condensation reaction of an aldehyde with an amine or an amide. The most common amines or amides are melamine, urea and benzoguanamine. However, condensation with other amines or amides may be employed. While the aldehyde employed is most often formaldehyde, other aldehydes such as acetaldehyde, croton aldehyde, benzaldehyde and furfural may be used. The aminoplast contains methylol or similar alkylol groups and preferably at least a portion of these alkylol groups are etherified by reaction with alcohol to provide organic solvent-soluble resins. Any monohydric alcohol can be employed for this purpose including such alcohols as methanol, ethanol, butanol and hexanol. Preferably, the aminoplasts which are used are melamine, urea or benzoguanamine-formaldehyde condensates etherified with alcohol containing from 1 to 4 carbon atoms such as methanol, ethanol, butanol or mixtures thereof.

Polyisocyanates and blocked polyisocyanates may also be used as curing agents. Examples of suitable polyisocyanates include monomeric polyisocyanates such as toluene diisocyanate and 4,4'-methylene-bis(cyclohexylisocyanate), isophorone diisocyanate and NCO-prepolymers such as the reaction product of monomeric polyisocyanates such as those mentioned above with polyester or polyether polyols.

The polyisocyanate may optionally be blocked. Examples of suitable blocking agents are those materials which would unblock at an elevated temperature such as lower aliphatic alcohols such as methanol, oximes such as methyl ethyl ketoxime, and lactams such as caprolactam. Blocked isocyanates can be used to form stable one-package systems. Polyfunctional isocyanates with free isocyanate groups can be used to form two-package room temperature-curable systems. In these systems, the active hydrogen-containing component (i.e., aliphatic diol reaction product and optional co-curing resin) and the isocyanate curing agent are mixed just prior to application.

The organic solvent of the coating composition may be any of the liquids or mixtures of liquids which are conveniently used as polymer solvents in coating compositions, for example, aliphatic hydrocarbons such as hexane and heptane, aromatic hydrocarbons such as toluene and xylene and petroleum fractions of various boiling point ranges which are predominantly aliphatic and have a significant aromatic content, esters such as butyl acetate, ethylene glycol diacetate and 2-ethoxyethyl acetate; ketones such as acetone, methyl isobutyl ketone and methyl amyl ketone; and alcohols such as butyl alcohol. The solvent is typically present in an amount of about 30 to 80 percent by weight of the coating composition based on total weight of solvent and resin solids.

Preferably, the coating compositions are of the high solids type, since the need for a rheology modifier to prevent sagging of the coating on vertical surfaces is greatest with these compositions. High solids coating compositions are prepared with low viscosity, low molecular weight resinous binders typically having number average molecular weights less than 5000, preferably less than 4000 and more preferably between 800 and 3000. The resin solids contents of such compositions are usually at least 50 percent, typically about 60 to 95 percent. When the microparticles are present as an additive in the coating compositions, they are present in an amount of at least 0.1, preferably about 0.1 to 30, more preferably 0.5 to 25 percent by weight. The film-forming polymer preferably is present in an amount of about 40 to 99.9, more preferably 50 to 99.5 percent by weight, and the crosslinking agent is present in an amount of 0 to 55, preferably 0 to 45 percent by weight; the percentages by weight being based on total weight of polymeric microparticles, film-forming polymer and crosslinking agent.

Optionally, the coating composition may include a pigment and may be any of the pigments conventionally used in surface coating compositions including inorganic pigments such as titanium dioxide, iron oxide, chromium oxide, lead chromate and carbon black; and organic pigments such as phthalocyanine blue and phthalocyanine green, carbazole violet and anthrapyrimidine yellow, flavanthrone yellow, isoindoline yellow, indanthrone blue, quinacridone violet and perylene reds. Also, metallic pigments such as aluminum flake and copper bronze flake may be used. When used, pigment contents of about 1 to 25 percent by weight based on total weight of the coating composition are typical.

If desired, the coating composition may additionally incorporate other known additives, for example, UV light stabilizers and catalysts. These ingredients, when used, constitute about 0.05 to 5 percent by weight based on total weight of the coating composition.

The coating compositions of the present invention can be applied to various substrates to which they adhere to form coated articles. The compositions herein can be applied by any conventional method including brushing, dipping, flow coating, electrodeposition, electrostatic spraying and the like, but they are most often applied by air spraying. The usual spray techniques and equipment are utilized. The coatings of the present invention can be applied over virtually any substrate including wood, metals, glass, cloth, plastics, foam and the like, as well as over various primers.

The coating compositions of the present invention can be used in forming a single coating or can be used in clear-over-color applications. In these applications, a pigmented or colored basecoat is adhered to the substrate or to a primed substrate to form a basecoat, and a clear coating is adhered to the basecoat. The coating compositions of the present invention may be in the basecoat, the clear coat or both the basecoat and the clear coat. Preferably, they are used as clear coats. Clear coats of the present invention are particularly resistant to yellowing which is believed to be due to the crosslinked microparticles present in the coating composition.

The invention is illustrated by but not limited to the following examples in which parts and percentages are by weight unless otherwise indicated.

EXAMPLES A–B

The following examples show the preparation of various styrene macromers.

EXAMPLE A

In this example, poly(para-methylstyrene) ethylmethacrylate macromer was prepared from the following mixture of ingredients:

| Ingredients | Parts by Weight (grams) |
|---|---|
| Dry cyclohexane | 1288.2 |
| Diphenyl ethylene | 8 drops |
| Secondary butyl lithium[1] | 2.1 |
| Secondary butyl lithium | 57.3 |
| para-methylstyrene | 1314 (1465 ml) |
| Ethylene oxide | 9.8 |
| Methacrylchloride | 22.4 |

[1]12.1 percent solution in cyclohexane.

A glass reactor was charged with the dry cyclohexane followed by the addition of the diphenyl ethylene and the first portion of secondary butyl lithium. The ingredients were stirred to get a light yellow color. The remaining portion of the secondary butyl lithium was added followed by the addition of 80 ml. of the para-methylstyrene. The ingredients were then heated to 60° C., the source of heat removed and the remaining portion of the para-methylstyrene added over a 2-hour period to maintain the temperature of the reaction mixture at 60° C.±2° C. After the completion of the addition of the para-methylstyrene, the reaction mixture (now a burgundy color) was held for ½ hour at 63° C. followed by the addition of the ethylene oxide.

The living polymer reaction mixture (now an orange color) was terminated by the addition of the methacrylchloride. The resulting macromer solution is precipitated in methanol. The white solid was filtered and air dried. The molecular weight of the polymer as determined by gel permeation chromatography using a polystyrene standard was $M_n$ 12406 and $M_w$ 15554.

EXAMPLE B

In this example, poly(para-t-butylstyrene) ethylmethacrylate macromer was prepared as generally described in Example A from the following mixture of ingredients:

| Ingredients | Parts by Weight (grams) |
|---|---|
| Dry cyclohexane | 455 |
| Diphenyl ethylene | 5 drops |
| 12.1% secondary butyl lithium | 2.1 |
| para-t-butylstyrene | 432.2 |
| Ethylene oxide | 2.9 |
| Methacrylchloride | 6.9 |

The resulting para-t-butylstyrene polymer macromer had a molecular weight as determined by gel permeation chromatography using a polystyrene standard of $M_n$ 11706 and $M_w$ 12864.

EXAMPLES I-IV

The following examples show the preparation of non-aqueous dispersions of polymeric particles including both uncrosslinked and crosslinked particles which are prepared by free radical initiated addition polymerization in organic solvent of a polymerizable ethylenically unsaturated monomer component in the presence of various styrene polymer macromers as dispersion stabilizers.

EXAMPLE I

A non-aqueous dispersion of methyl methacrylate was prepared from the following mixture of ingredients:

| Ingredients | Parts by Weight (grams) |
|---|---|
| Kettle Charge | |
| Poly(para-t-butylstyrene) ethyl methacrylate macromer of Example A | 30 |
| Cyclohexane | 233.3 |
| Seed Charge | |
| VAZO-67[1] | 0.5 |
| Feed A | 28.3 |
| Feed A | |
| Cyclohexane | 26.7 |
| Butyl acetate | 40 |
| Methyl methacrylate | 120.0 |
| Octyl mercaptan | 0.7 |
| VAZO-67 | 0.5 |

[1]Azobis-(2-methylbutyronitrile), available from E. I. DuPont de Nemours and Company.

The kettle charge was added to a glass reactor and heated to reflux at 80° C. The seed charge was added and reflux maintained for another 30 minutes. Feed A was added to the reaction mixture over a period of about 3 hours maintaining the temperature at about 80°-81° C. At the completion of Feed A, the reaction mixture was held at 81° C. for about 1 hour to complete the reaction. A stable non-aqueous dispersion of polymethyl methacrylate was obtained which had a solids content of 37.9 percent.

EXAMPLE II

A non-aqueous dispersion of crosslinked polymeric microparticles which were obtained from the polymerization of methyl methacrylate, glycidyl methacrylate and methacrylic acid was prepared from the following mixture of ingredients:

| Ingredients | Parts by Weight (grams) |
|---|---|
| Kettle Charge | |
| Polystyrene ethylmethacrylate macromer[1] | 457.0 |
| Cyclohexane | 1039.5 |
| Toluene | 935.6 |
| Heptane | 2183.0 |
| Seed Charge | |
| VAZO-67 | 9.0 |
| Feed A | 502.2 |
| Feed A | |
| Cyclohexane | 299.3 |
| Butyl acetate | 448.1 |
| Toluene | 134.4 |
| Heptane | 313.7 |
| Methyl methacrylate | 1959.0 |
| VAZO-67 | 6.3 |
| Octyl mercaptan | 12.5 |
| Glycidyl methacrylate | 120.1 |
| Methacrylic acid | 71.7 |
| ARMEEN DMCD[2] | 10.8 |

[1]Polystyrene macromer having a number average molecular weight of about 12,000, commercially available from Sartomer Company.
[2]Dimethyl cocoamine, available from Armour Company.

The kettle charge was added to a glass reactor and heated to reflux at 90° C. The seed charge was added and the reaction mixture held at reflux for about 1 hour followed by the addition of Feed A over a 3-hour period while maintaining the temperature at about 90° C. At the completion of Feed A, the reaction mixture was held for 1 hour at 90° C., cooled and filtered. A stable non-aqueous dispersion of crosslinked polymeric microparticles was prepared which had a resin solids content of 30.4 percent.

EXAMPLE III

A non-aqueous dispersion of crosslinked polymeric microparticles similar to that of Example II was prepared with the exception that the dispersion stabilizer was the poly(para-methylstyrene) ethylmethacrylate macromer of Example B.

| Ingredients | Parts by Weight (grams) |
|---|---|
| Kettle Charge | |
| Poly(para-methylstyrene) ethyl methacrylate macromer of Example B | 28.6 |
| Cyclohexane | 65.0 |
| Toluene | 58.5 |
| Heptane | 136.5 |
| Seed Charge | |
| VAZO-67 | 0.5 |
| Feed A | 31.4 |
| Feed A | |
| Cyclohexane | 18.7 |
| Butyl acetate | 28.0 |
| Toluene | 8.4 |
| Heptane | 19.6 |
| Methyl methacrylate | 122.4 |
| VAZO-67 | 0.5 |
| Octyl mercaptan | 0.8 |
| Glycidyl methacrylate | 7.5 |
| Methacrylic acid | 4.5 |
| ARMEEN DMCD | 0.7 |

The kettle charge was added to a glass reactor and heated to reflux at 91° C. The seed charge was added and the reaction temperature held at reflux for about 30 minutes followed by the addition of Feed A over a 3-hour period while maintaining the reaction temperature at about 91° C. At the completion of Feed A, the reaction mixture was held for about 1 hour to complete the polymerization followed by cooling and filtering. A stable non-aqueous dispersion of crosslinked polymeric microparticles was prepared which had a resin solids content of 34.1 percent.

EXAMPLE IV

A non-aqueous dispersion of crosslinked polymeric microparticles was formed from polymerizing methyl methacrylate, isocyanatoethyl methacrylate and hydroxyethyl methacrylate in the presence of poly(para-t-butylstyrene) ethylmethacrylate macromer as a dispersion stabilizer.

| Ingredients | Parts by Weight (grams) |
|---|---|
| Kettle Charge | |
| Poly(para-t-butylstyrene) ethyl methacrylate macromer of Example A | 28.6 |
| Cyclohexane | 65.0 |
| Toluene | 58.5 |
| Heptane | 136.5 |
| Seed Charge | |
| VAZO-67 | 0.5 |
| Feed A | 31.4 |
| Feed A | |
| Cyclohexane | 18.7 |
| Butyl acetate | 28.0 |
| Toluene | 8.4 |
| Heptane | 19.6 |
| Methyl methacrylate | 117.5 |
| VAZO-67 | 0.5 |
| Isocyanatoethyl methacrylate | 6.5 |
| Hydroxyethyl methacrylate | 9.8 |
| Dibutyltin dilaurate | 0.3 |

The kettle charge was added to a glass reactor and heated to reflux at 91° C. The seed charge was added and the reaction mixture held at reflux for 30 minutes followed by the addition of Feed A over a 3-hour period while maintaining the reaction temperature at 91° C. At the completion of Feed A, the reaction mixture was held for 1 hour at 91° C. to complete the polymerization followed by cooling and filtering the resulting non-aqueous dispersion. The dispersion of crosslinked polymeric microparticles was stable and had a resin solids content of 34.3 percent.

We claim:

1. A non-aqueous dispersion of polymeric particles having an average particle size ranging from 0.1 to 10 microns in an organic dispersing liquid which is formed by the free radical initiated addition polymerization of 20 to 70 percent by weight of a polymerizable ethylenically unsaturated monomer component in 25 to 80 percent by weight of the dispersing liquid; the polymerization being conducted in the presence of 1 to 25 percent by weight of a dispersion stabilizer, the percentage by weight being based on total weight of polymerizable ethylenically unsaturated monomer component, dispersing liquid and stabilizer, characterized in that the dispersion stabilizer is a styrene polymer and containing ethylenic unsaturation in only the terminal position.

2. The non-aqueous disperson of claim 1 in which the styrene polymer is prepared by anionic polymerization techniques.

3. The dispersion of claim 1 in which the polymer particles are crosslinked.

4. The dispersion of claim 3 in which the polymerizable monomer component contains a first and second ethylenically unsaturated monomer each having functionalities capable of crosslinking reaction with one another.

5. The dispersion of claim 4 wherein the pair of reactive functionalities of said ethylenically unsaturated monomers are acid and epoxide.

6. The dispersion of claim 4 wherein the pair of reactive functionalities of said ethylenically unsaturated monomer are isocyanate and hydroxyl.

7. The dispersion of claim 5 wherein the pair of ethylenically unsaturated monomers are methacrylic acid and glycidyl methacrylate.

8. The dispersion of claim 1 in which the organic liquid is an aliphatic or cycloaliphatic hydrocarbon.

9. The dispersion of claim 1 in which the styrene polymer is a polymer selected from the class consisting of styrene, para-methylstyrene and para-t-butylstyrene including mixtures thereof.

10. The dispersion of claim 1 in which the styrene polymer has a molecular weight of at least 1000.

11. The dispersion of claim 10 in which the styrene polymer has a molecular weight in the range of 5,000 to 50,000.

12. The dispersion of claim 1 in which the styrene polymer has only one terminal ethylenically unsaturated group.

13. The dispersion of claim 1 in which the polymerizable monomer component contains polymerizable acrylate unsaturation and the dispersion stabilizer contains acrylate unsaturation.

14. A polymeric microparticle having an average particle size ranging from 0.1 to 10 microns which is prepared by free radical addition polymerization of 20 to 70 percent by weight of a polymerizable ethylenically unsaturated monomer component in 20 to 85 percent by weight of an organic dispersing liquid, said polymerization being conducted in the presence of 1 to 25 percent by weight of a dispersion stabilizer, the percentage by weight being based on total weight of polymerizable ethylenically unsaturated monomer component, dispersing liquid and stabilizer, characterized in that the dispersion stabilizer is a styrene polymer containing ethylenic unsaturation is the terminal position only.

15. The microparticles of claim 14 which are crosslinked.

16. The microparticles of claim 15 in which the polymerizable monomer component contains a first and second ethylenically unsaturated monomer each having functionalities capable of a crosslinking reaction with one another.

17. The microparticles of claim 16 wherein the pair of reactive functionalities of said ethylenically unsaturated monomers are acid and epoxide.

18. The microparticles of claim 17 wherein the pair of ethylenically unsaturated monomers are methacrylic acid and glycidyl methacrylate.

19. The microparticles of claim 16 wherein the pair of reactive functionalities of said ethylenically unsaturated monomers are isocyanate and hydroxyl.

20. The microparticle of claim 14 in which the styrene polymer is a polymer selected from the class consisting of styrene, para-methylstyrene and para-t-butylstyrene including mixtures thereof.

21. The microparticle of claim 20 in which the styrene polymer has a molecular weight of at least 1000.

22. The microparticle of claim 21 in which the styrene polymer has a molecular weight in the range of 5,000 to 50,000.

23. The microparticle of claim 14 in which the styrene polymer has only one terminal ethylenically unsaturated group.

24. A coating composition comprising a solution of a film-forming polymer in combination with polymeric microparticles which are insoluble in the film-forming polymer solution; said polymeric microparticles having an average particle size ranging from 0.1 to 10 microns being prepared by free radical addition polymerization in an organic dispersing liquid of 20 to 70 percent by weight of a polymerizable ethylenically unsaturated monomer component in 25 to 80 percent by weight of the dispersing liquid, said polymerization being conducted in the presence of 1 to 25 percent by weight of a dispersion stabilizer, the percentage by weight being based on total weight of polymerizable ethylenically unsaturated monomer component, dispersing liquid and stabilizer, characterized in that the dispersion stabilizer is a styrene polymer containing ethylenic unsaturation in only the terminal position.

25. The coating composition of claim 24 in which the polymer particles are crosslinked.

26. The coating composition of claim 25 in which the polymerizable monomer component contains a first and second ethylenically unsaturated monomer each having functionalities capable of a crosslinking reaction with one another.

27. The coating composition of claim 26 wherein the pair of reactive functionalities of said ethylenically unsaturated monomers are acid and epoxide.

28. The coating composition of claim 27 wherein the pair of ethylenically unsaturated monomers are methacrylic acid and glycidyl methacrylate.

29. The coating composition of claim 26 wherein the pair of reactive functionalities of said ethylenically unsaturated monomers are acid and epoxide.

30. The coating composition of claim 24 in which the styrene polymer is a polymer selected from the class consisting of styrene, para-methylstyrene and para-t-butylstyrene including mixtures thereof.

31. The coating composition of claim 24 in which the styrene polymer has a molecular weight of at least 1000.

32. The coating composition of claim 31 in which the styrene polymer has a molecular weight of 5,000 to 50,000.

33. The coating composition of claim 24 in which the styrene polymer has only one terminal ethylenically unsaturated group.

34. The coating composition of claim 25 which is a clear coating composition.

35. A coated article comprising a substrate and a coating containing the polymeric microparticle of claim 14 adhered thereto.

36. A coated article comprising a substrate and a pigmented base coating adhered thereto and a clear coating adhered to the pigmented base coating in which the clear coating contains the polymeric microparticle of claim 14.

37. The coated article of claim 36 in which both the pigmented base coating and the clear coating contain the polymeric microparticle of claim 14.

* * * * *